(12) United States Patent
Levinson et al.

(10) Patent No.: US 6,299,338 B1
(45) Date of Patent: Oct. 9, 2001

(54) DECORATIVE LIGHTING APPARATUS WITH LIGHT SOURCE AND LUMINESCENT MATERIAL

(75) Inventors: Lionel Monty Levinson; Alok Mani Srivastava, both of Schenectady; Steven Jude Duclos, Clifton Park; Anil Raj Duggal, Niskayuna, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/203,213

(22) Filed: Nov. 30, 1998

(51) Int. Cl.[7] .............................. F21K 2/00; F21V 9/16
(52) U.S. Cl. ......................... 362/559; 362/231; 362/84; 362/293; 362/565; 40/542; 40/444; 40/547
(58) Field of Search .......................... 362/84, 230, 231, 362/293, 556, 560, 559, 565, 555, 566, 582, 27; 40/542, 543, 444, 581, 547

(56) References Cited

U.S. PATENT DOCUMENTS

| | | | |
|---|---|---|---|
| 4,603,065 | 7/1986 | Mori et al. | 428/31 |
| 4,645,970 | 2/1987 | Murphy | 313/509 |
| 5,301,090 | 4/1994 | Hed | 362/558 |
| 5,416,674 | * 5/1995 | Murai | 362/84 |
| 5,461,188 | 10/1995 | Drago et al. | 84/600 |
| 5,477,430 | * 12/1995 | La Rose | 362/84 |
| 5,572,817 | 11/1996 | Chien | 40/544 |
| 5,578,839 | 11/1996 | Nakamura et al. | 257/96 |
| 5,604,763 | 2/1997 | Kato et al. | 372/45 |
| 5,607,222 | * 3/1997 | Woog | 362/84 |
| 5,639,157 | 6/1997 | Yeh | 362/567 |
| 5,644,584 | 7/1997 | Nam et al. | 372/20 |
| 5,649,755 | 7/1997 | Rapisarda | 362/555 |
| 5,678,917 | * 10/1997 | Bergkvist | 362/84 |
| 5,741,058 | 4/1998 | Suzuki et al. | 362/27 |
| 5,752,337 | 5/1998 | Chien | 40/540 |
| 5,813,752 | 9/1998 | Singer et al. | 362/293 |
| 5,813,753 | 9/1998 | Vriens et al. | 362/293 |
| 5,833,349 | * 10/1998 | Apple | 362/84 |
| 5,959,316 | 9/1999 | Lowery | 257/98 |
| 5,998,925 | 12/1999 | Shimizu et al. | 313/503 |
| 6,036,328 | 3/2000 | Ohtuski et al. | 362/31 |
| 6,036,375 | 3/2000 | Yanagisawa et al. | 385/94 |
| 6,139,174 | * 10/2000 | Butterworth | 362/555 |

FOREIGN PATENT DOCUMENTS

| | | |
|---|---|---|
| 60182402 | 9/1985 | (JP). |
| 7176794 | 7/1995 | (JP). |
| 87614 | 1/1996 | (JP). |
| 950704 | 2/1997 | (JP). |
| 992886 | 4/1997 | (JP). |
| 9209909 | 6/1992 | (WO). |

OTHER PUBLICATIONS

G. Blasse et al., Fluorescence of Eu2+ Activated Silicates, 23 Philips Res. Repts. 189–200 (1968). Philips Research Laboratories, vol. 23, pp. 201–206, 1968.

(List continued on next page.)

Primary Examiner—Alan Cariaso
(74) Attorney, Agent, or Firm—Toan P. Vo; Noreen C. Johnson

(57) ABSTRACT

An exemplary lighting apparatus comprises a light source such as an LED, a transmissive body optically coupled to the light source, and at least one region of luminescent material formed on a portion of the transmissive body, the at least one region of luminescent material forming an ornamental design on the transmissive body, wherein the at least one region of luminescent material absorbs light having a first spectrum transmitted through the transmissive body and emits light having a second spectrum outside of the transmissive body. The lighting apparatus can be used in a decorative manner, such as for holiday lighting or as a display. The lighting apparatus can be used to display a variety of patterns and shapes and can operate safely at low power over a long lifetime.

42 Claims, 2 Drawing Sheets

OTHER PUBLICATIONS

G. Blasse and A. Bril, Fluorescence of Eu2+ Activated Alkaline–Earth Aluminates, 23 Philips Res. Repts. 201–206 (1968). Philips Research Laboratories, vol. 23, pp. 189–200, 1968.

G. Blasse and B. C. Grabmaier, Luminescent Materials, 10–16, 71–90, 111–130 (1994). Springer–Verlag, NY ISBN 3–540–58019–0.

Keith H. Butler, Fluorescent Lamp Phosphors, 49–60 (1980). Pennsylvania State University Press.

R. K. Datta, Luminescent Behavior of Bismuth in Rare–Earth Oxides, 114 J. Electrochem. Soc.: Solid State Science 1137–1142 (1967). Lighting Research Lab, General Electric Co, Cleveland, OH.

L. Eichenauer et al., Optical Characterization of Europium and Cerium in Strontium Thiogallate Thin Films and Powders, 153 Phys. Stat. Sol. 515–527 (1996).

R. Mach, Thin Film Electroluminescence Devices, Solid State Luminescence 229–262 (A.H. Kitai, Ed. 1993). Chapman & Hall, London, NY, Tokyo.

Phosphor Handbook, 217–230, 367–373, 581–600, 651–658, 899–921 (Shigeo Shionoya et al. eds., CRC Press 1999). CRC Press, Boston.

Xiao Zhang and Xingren Liu, Luminescence Properties and Energy Transfer of Eu2+ Doped Ca8Mg(SiO4)4Cl2 Phosphors, 139 J. Electrochem Soc. 622–625 (1992).

* cited by examiner

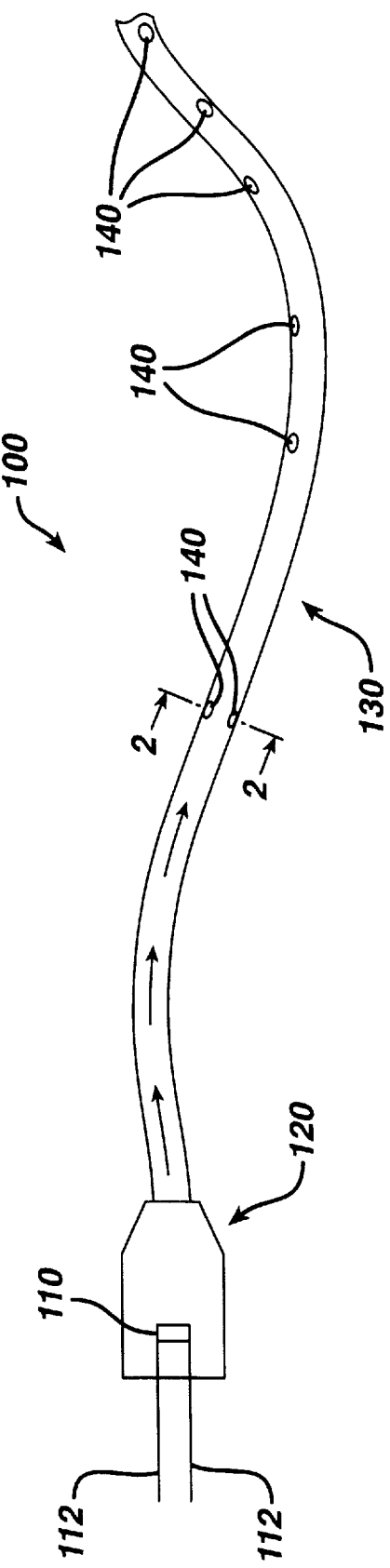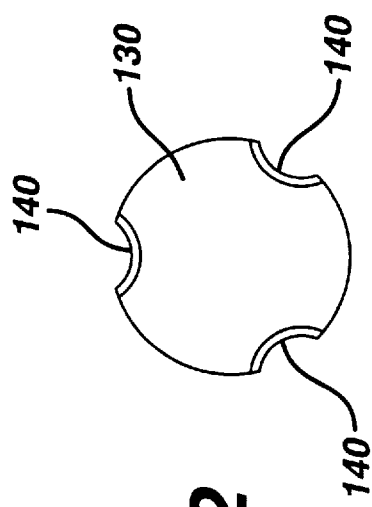

DECORATIVE LIGHTING APPARATUS WITH LIGHT SOURCE AND LUMINESCENT MATERIAL

BACKGROUND

1. Field of the Invention

The present invention relates generally to decorative lighting, and more particularly to a lighting apparatus which includes a light source and a luminescent material which absorbs light from the light source and emits light of a different color.

2. Description of the Related Art

Examples of decorative lighting are numerous. U.S. Pat. No. 5,649,755, for example, discloses an elongated, decorative, flexible, light-transmitting assembly, useful for adorning wearing apparel, which includes a source of light having a light-transmitting area. A length of clear flexible polymer has a first end adjacent the light transmitting area and an elongated body having an outer surface and a remote end. The length has many marks formed inwardly from the outer surface to cause the light entering the first end to be reflected in an attractive manner.

Another example of decorative lighting is disclosed in U.S. Pat. No. 5,752,337. This patent discloses a multi-color illuminated panel made up of a decorative frontsheet having windows cut therein, a transparent supporting sheet, which may also have decorative printing thereon, and a pre-wired backsheet on which are affixed discrete individual single-color electro-luminescent light panel segments. The electro-luminescent light segments may have different colors and are arranged to shine through the windows and provide a multi-color lighting effect.

U.S. Pat. No. 5,639,157 discloses a decorative string lighting system which includes a plurality of illuminators, a power cord for connection to a source of electrical power, and a wire harness for feeding the power to the illuminators. The system can also include a multiplicity of light output transducers, a control circuit powered from an external source for activating the transducers, the transducers of an illuminator subset being in separate circuit paths for independent activation by the control circuit, a translucent illuminator body, a fiber-optic element, one end of the element being optically connected to the illuminator body, and a coupler member optically connected to an opposite end of the fiber optic element, the coupler member being formed for receiving light from the illuminator subset and transmitting the light into the fiber optic element for lighting the illuminator body, means for producing spectrally distinct light from each transducer of the illuminator subset, whereby the illuminator body is lighted in colors corresponding to activated ones of the transducers of the coupler subset.

Although the above examples of decorative lighting are satisfactory, it would be desirable to have a decorative lighting apparatus which was simple in design, and which provided enhanced flexibility in emitting light of desired colors at selected locations in desired patterns.

SUMMARY

An exemplary lighting apparatus comprises a light source, a transmissive body optically coupled to the light source, and at least one region of luminescent material formed on a portion of the transmissive body, the at least one region of luminescent material forming an ornamental design on the transmissive body, wherein the at least one region of luminescent material absorbs light having a first spectrum transmitted through the transmissive body and emits light having a second spectrum outside of the transmissive body. The lighting apparatus can be used in a decorative manner, such as for holiday lighting or as a display. The lighting apparatus can be used to display a variety of patterns and shapes and can operate safely at a low power over a long lifetime.

BRIEF DESCRIPTION OF THE DRAWINGS

Other features and advantages of the invention will be apparent from the following detailed description and the accompanying drawings, in which:

FIG. 1 illustrates a lighting apparatus having a light source and a transmissive body according to one embodiment of the invention;

FIG. 2 illustrates a cross section of the transmissive body of FIG. 1;

DETAILED DESCRIPTION OF THE PREFERRED EMBODIMENTS

Figure 3:
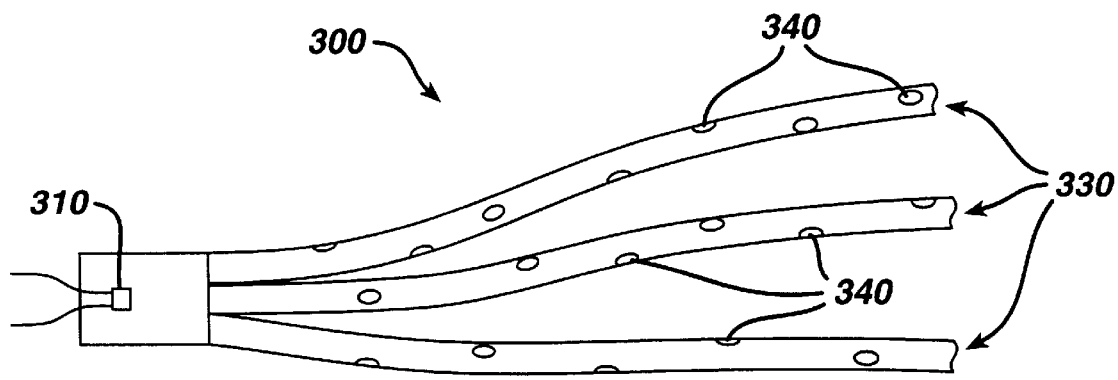
FIG. 3 illustrates a lighting apparatus having a light source and a plurality of transmissive bodies according to another embodiment of the invention.

FIG. 1 illustrates a lighting apparatus according to one embodiment of the invention. The lighting apparatus 100 includes a light source 110 powered via electrical connectors 112, an optical coupler 120, a transmissive body 130, and at least one region of luminescent material 140.

The light source 110 typically comprises a light emitting diode (LED) or a laser diode. For example, the light source may comprise an LED or a laser diode which emits ultra-violet (UV) or blue light. Such LEDs and laser diodes are available commercially from Nichia Industrial Chemicals Ltd. in Japan. Examples of LEDs which emit blue or UV radiation are described in U. S. Pat. Nos. 5,813,752 and 5,813,753. Examples of laser diodes which emit blue or UV radiation are described in U.S. Pat. Nos. 5,604,763 and 5,644,584. See also Shuji Nakamura and Gerhard Fasol, "The Blue Laser Diode" (1997).

The light source 110 can be optically coupled to the transmissive body 130 by an optical coupler 120. The optical coupler 120 may be in the shape of a truncated cone such that substantially all the radiation emitted from the light source 110 is coupled into the transmissive body 130. The optical coupler 120 and the transmissive body are preferably transparent in the wavelengths emitted by the light source 110. Typically, the optical coupler 120 and the transmissive body 130 are formed of a flexible material such as a polymer (e.g. epoxy or thermoplastic), a silicone, or a glass. For example, a polymer material having a thickness on the order of 1 mm may be flexible enough to bend with a radius of curvature of 1 mm or less without damage to the material. The optical coupler and transmissive body can be formed integrally as a single piece, in which case the optical coupler is merely the end portion of the transmissive body.

The lighting apparatus 100 is typically configured such that substantially all the light from the light source 110 is transmitted through the transmissive body 130 by total internal reflection. The transmissive body 130 can be a fiber optic cable, for example, through which the light from the light source propagates by total internal reflection.

Formed on the transmissive body 130 is at least one, and typically a plurality of regions of luminescent material 140.

Typically, the luminescent material comprises an inorganic phosphor, as will be described below. However, other types of luminescent materials such as organic luminescent materials and dyes can be used in conjunction with exemplary embodiments of the invention.

In operation, the light source 110 generates light of a certain spectrum which is coupled to the transmissive body 130 through the optical coupler 120. The light propagates through the transmissive body until it is incident on one of the phosphor regions 140. The phosphor region 140 absorbs some fraction of the light from the light source which has a first spectrum and emits light of a different spectrum which is directed outside of the transmissive body 130 to produce a decorative effect.

The phosphor regions are typically decorative or ornamental in nature. The phosphor regions can be formed in any desired shape, pattern, or ornamental design. For example, as shown in FIG. 1, the phosphor regions may comprise a plurality of discrete circular regions which are distributed along the length of the fiber optic cable. The phosphor regions may also comprise other shapes or patterns such as diamonds, helixes, ellipses, letters, numbers, or any other pattern or design, whether simple or elaborate. Typically, the phosphor regions cover only a portion of the surface of the transmissive body, rather than the entire surface of the transmissive body.

The phosphor regions may have different compositions to produce different colors when irradiated by radiation from the light source. For example, the following phosphors can be used with a UV light source:

| Phosphor | Emitting Color |
| --- | --- |
| $(Sr,Ba,Ca)_5(PO_4)_3Cl:Eu^{2+}$ | blue |
| $BaMg_2Al_{16}O_{27}:Eu^{2+}$ | blue |
| $BaMgAl_{10}O_{17}:Eu^{2+}$ | blue |
| $Ca_8Mg(SiO_4)_4Cl_2:Eu^{2+}, Mn^{2+}$ | green |
| $Ba_2SiO_4:Eu^{2+}$ | green |
| $Ba_2(Mg,Zn)Si_2O_7:Eu^{2+}$ | green |
| $(Ba,Sr)Al_2O_4:Eu^{2+}$ | green |
| $Y_2O_3:Bi^{3+}, Eu^{3+}$ | red |

The following phosphors can be used with a blue light source:

| Phosphor | Emitting Color |
| --- | --- |
| $Y_3Al_5O_{12}$—$Ce^{3+}$ | yellow |
| $Ba_2MgSi_2O_7:Eu^{2+}$ | yellow |
| $Ba_2SiO_4:Eu^{2+}$ | yellow |
| $SrS:Eu^{2+}$ | red |
| $SrY_2S_4:Eu^{2+}$ | red |
| $CaLa_2S_4:Ce^{3+}$ | red |
| $(Ca,Sr)S$ | red |
| $(Sr,Ca,Ba)(Al,Ga)_2S_4:Eu^{2+}$ | green |

Combinations of the above phosphors can be used to produce white light. For example, with a blue light source, $Y_3Al_5O_{12}$—$Ce^{3+}$ can be combined with one of $SrS:Eu^{2+}$; $SrY_2S_4:Eu^{2+}$; and $CaLa_2S_4:Ce^{3+}$ to produce white light. $(Ca,Sr)S$ can be combined with $(Sr,Ca,Ba)(Al,Ga)_2S_4:Eu^{2+}$ to produce white light. With a UV light source, a combination of the listed red, green, and blue phosphors can be used to produce white light. Other colors can be produced with appropriate combinations of phosphors, as will be recognized by those skilled in the art.

The phosphor regions can be formed in a number of ways. According to one embodiment, the phosphor regions are deposited directly onto portions of the surface of the transmissive body. The light propagating through the transmissive body which is incident on the phosphor regions is converted in wavelength and directed out of the transmissive body. Directly depositing the phosphor regions on the surface of the transmissive body provides the advantage of ease of manufacturing.

According to other embodiments, the phosphor regions are formed on indentations on the transmissive body. For example, FIG. 2 shows a cross section of the transmissive body 130 of FIG. 1 which includes three indentations upon which three phosphor regions 140 are formed. The indentations can be spherical in shape, for example, or can have flat surfaces like a notch. The phosphor regions can also be formed on a roughened surface which acts to scatter light propagating down the transmissive body 130.

Typically, the indentation, notch, or roughened surface upon which the phosphor is deposited projects into the transmissive body. For example, as shown in FIG. 2, the indentations project into the fiber optic cable. In this way, the indentations provide a larger surface upon which light propagating through the transmissive body is incident. These embodiments may provide the advantage that more light propagating through the transmissive body is absorbed by the phosphor regions, making them appear brighter.

According to another embodiment of the invention, the phosphor regions can be formed around a sharp bend, e.g. 90–135°, in the fiber optic cable or transmissive body. The bend in the transmissive body scatters the light propagating therethrough onto the phosphor region formed on the bend which converts the light to a different color.

According to other embodiments, a splice region is formed in the transmissive body to scatter light. For example, two pieces of fiber optic cable can be spliced together such that the splice region scatters light propagating therethrough. A phosphor region is applied to the surface of the transmissive body around the splice region to absorb the light scattered by the splice region and to convert the light to a different spectrum and transmit the light outside of the transmissive body. The phosphor region can also be sandwiched in the splice region between the two pieces of fiber optic cable.

To prevent light from escaping from the transmissive body, a reflective or blocking coating can be applied to the outer surface of the transmissive body between the phosphor regions. The coating may comprise, for example, a reflective metal such as aluminum or silver applied by evaporation, or a reflective multilayer dielectric film such as $SiO_2/TiO_2$. The coating may itself be covered on the outside by a paint of an appropriate color, e.g. green for holiday decorations. The coating and paint layer can protect the transmissive body from physical damage, enhance the contrast between the phosphor regions and non-phosphor regions by eliminating scattered light between phosphor regions, and prevent UV light from escaping from the transmissive body.

FIG. 3 illustrates a lighting apparatus according to another embodiment of the invention. The lighting apparatus 300 includes a light source 310, a plurality of transmissive bodies 330, and a plurality of phosphor regions 340. The light source 310 may be an LED or a laser diode, for example. The transmissive bodies 330 may comprise fiber optic cables which transmit the light by total internal reflection. The phosphor regions 340 may be arranged in any desired pattern and function to convert the radiation emitted from the light source 310 into visible light. The transmissive body 330 may be coated with a reflective coating and outer paint layer, as described above, to prevent light from escaping from the transmissive body between the phosphor regions.

Figure 4:
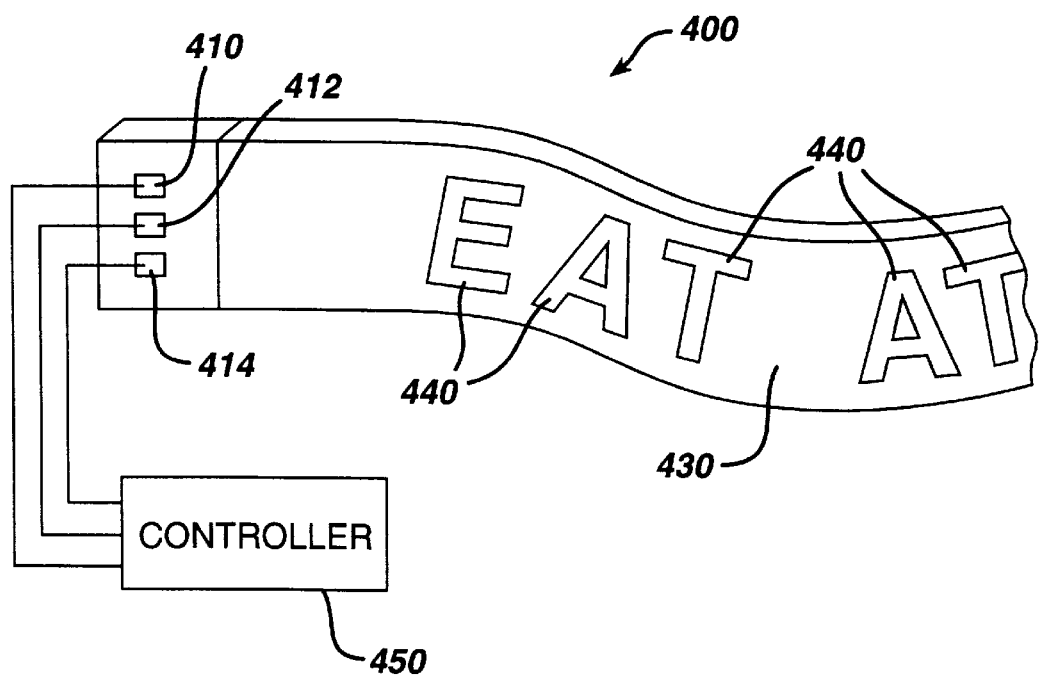
FIG. 4 illustrates a lighting apparatus having a plurality of light sources and a transmissive body in the form of a thin strip according to another embodiment of the invention.

FIG. 4 illustrates a decorative lighting apparatus according to another embodiment of the invention. The lighting apparatus 400 includes a plurality of light sources 410, 412, 414, a transmissive body 430, and a plurality of phosphor regions 440. The light sources 410, 412, 414 may comprise, for example, LEDs which emit light at different wavelengths, e.g. UV, blue, green, red. The light sources 410, 412, 414 may also emit the same wavelength. For example, three UV LEDs can be used so that the radiation emitted by the LEDs is invisible while the radiation emitted by the phosphor regions is visible.

The transmissive body 430 may be in the form of a thin sheet (e.g. having a thickness between $10^{-3}$ cm and 1 cm) as shown in FIG. 4, or in any other shape. The phosphor regions 440 may be formed in any desired shape or pattern, such as the letters depicted in FIG. 4, or other letters, numbers, pictures, patterns, and designs. Different phosphor regions, e.g. different words or letters in FIG. 4, can comprise different phosphors such that they are caused to luminesce by only certain ones of the LEDs, and not by the other LEDs. For example, the first word "EAT" may comprise one or more phosphors which are activated only by the first LED 410, while the second word "AT" comprises one or more phosphors which are activated only by the second LED 412, etc. Illumination of the various phosphor regions can thus be controlled to occur at preselected times and in various combinations by activating the corresponding LEDs. As shown in FIG. 4, a controller 450 can be utilized to activate the LEDs according to a desired schedule. The transmissive body 430 may also be coated with a reflective coating and outer paint layer, as described above, to prevent light from escaping from the transmissive body between the phosphor regions.

Other embodiments of the invention will be apparent to those skilled in the art from a consideration of the embodiments disclosed herein. For example, laser diodes and other light sources can be used in addition to LEDs. The transmissive body can be formed of various polymer or glass materials. A variety of patterns, shapes, sizes, and powers can be implemented as desired. The lighting apparatus can be sewn into clothing or used as jewelry or other adornments. In addition to providing a great variety of applications, exemplary embodiments of the invention can operate safely at a low power (e.g. less than one watt) over a long lifetime (e.g. tens of thousands of hours). It is intended that the specification and examples be considered as exemplary only, with the scope and spirit of the invention being defined by the following claims.

What is claimed is:

1. A lighting apparatus comprising:
   a light source;
   a transmissive body optically coupled to the light source; and
   at least one region of luminescent material formed on a defined portion of the transmissive body, the at least one region of luminescent material forming an ornamental design on the transmissive body, wherein the at least one region of luminescent material absorbs light having a first spectrum transmitted through the transmissive body and emits light having a second spectrum outside of the transmissive body and wherein substantially all light emitted by the light source is transmitted through the transmissive body by total internal reflection.

2. The lighting apparatus of claim 1, wherein the at least one region of luminescent material comprises a phosphor.

3. The lighting apparatus of claim 1, wherein the at least one region of luminescent material is formed on an outside surface of the transmissive body.

4. The lighting apparatus of claim 1, further comprising a coating on a second portion of the transmissive body not occupied by the at least one region of luminescent material, which coating prevents light from escaping from the transmissive body.

5. The lighting apparatus of claim 4, wherein the coating comprises a reflective metal.

6. The lighting apparatus of claim 4, wherein the coating comprises a reflective multilayer dielectric film.

7. A lighting apparatus comprising:
   a light source;
   a transmissive body optically coupled to the light source; and
   at least one region of luminescent material formed on a defined portion of the transmissive body, the at least one region of luminescent material forming an ornamental design on the transmissive body, wherein the at least one region of luminescent material absorbs light having a first spectrum transmitted through the transmissive body and emits light having a second spectrum outside of the transmissive body, and wherein the transmissive body includes at least one indentation upon which the at least one region of luminescent material is deposited.

8. A lighting apparatus comprising:
   a light source;
   a transmissive body optically coupled to the light source; and
   at least one region of luminescent material formed on a defined portion of the transmissive body, the at least one region of luminescent material forming an ornamental design on the transmissive body, wherein the at least one region of luminescent material absorbs light having a first spectrum transmitted through the transmissive body and emits light having a second spectrum outside of the transmissive body, and wherein the transmissive body includes at least one roughened surface upon which the at least one region of luminescent material is deposited.

9. A lighting apparatus comprising:
   a light source;
   a transmissive body optically coupled to the light source, the transmissive body comprising a fiber optic cable; and
   at least one region of luminescent material formed on a portion of the transmissive body, the at least one region of luminescent material forming an ornamental design on the transmissive body, wherein the at least one region of the luminescent material absorbs light having a first spectrum transmitted through the transmissive body and emits light having a second spectrum outside of the transmissive body.

10. The lighting apparatus of claim 9, wherein the at least one region of luminescent material comprises a plurality of discrete regions of luminescent material which are distributed along the surface of the fiber optic cable.

11. A lighting apparatus comprising:
    a light source;

a transmissive body optically coupled to the light source; and at least one region of luminescent material formed on a defined portion of the transmissive body, the at least one region of luminescent material forming an ornamental design on the transmissive body, wherein the at least one region of luminescent material absorbs light having a first spectrum transmitted through the transmissive body and emits light having a second spectrum outside of the transmissive body, and wherein the transmissive body comprises a fiber optic cable, the fiber optic cable including a splice region which scatters light outside of the transmissive body.

12. The lighting apparatus of claim 11, wherein the at least one region of luminescent material is sandwiched between two pieces of fiber optic cable in the splice region.

13. The lighting apparatus of claim 11, wherein the at least one region of luminescent material is formed on an outside surface of the fiber optic cable around the splice region.

14. The lighting apparatus of claim 1, wherein the transmissive body is in the form of a thin sheet, and the at least one region of luminescent material comprises a decorative pattern on the surface of the sheet.

15. The lighting apparatus of claim 1, wherein the transmissive body is in the form of a thin sheet, and the at least one region of luminescent material includes at least one of: letters of the alphabet and numbers.

16. The lighting apparatus of claim 1, wherein the transmissive body comprises at least one of a polymer, a silicone, and glass material.

17. The lighting apparatus of claim 1, wherein the transmissive body comprises a flexible material.

18. The lighting apparatus of claim 1, wherein the light source comprises a light emitting diode.

19. The lighting apparatus of claim 18, wherein the light emitting diode emits blue light.

20. The lighting apparatus of claim 18, wherein the light emitting diode emits ultraviolet radiation.

21. The lighting apparatus of claim 1, wherein the light source comprises a laser diode.

22. The lighting apparatus of claim 1, wherein the at least one region of luminescent material includes at least one of the following phosphors: $Y_3Al_5O_{12}$—$Ce^{3+}$; $Ba_2MgSi_2O_7:Eu^{2+}$; $Ba_2SiO_4:Eu^{2+}$; $SrS:Eu^{2+}$; $SrY_2S_4:Eu^{2+}$; $CaLa_2S_4:Ce^{3+}$; $(Ca,Sr)S$; and $(Sr,Ca,Ba)(Al,Ga)_2S_4:Eu^{2+}$.

23. The lighting apparatus of claim 1, wherein the at least one region of luminescent material includes at least one of the following phosphors: $(Sr,Ba,Ca)_5(PO_4)_3Cl:Eu^{2+}$; $BaMg_2Al_{16}O_{27}:Eu^{2+}$; $BaMgAl_{10}O_{17}:Eu^{2+}$; $Ca_8Mg(SiO_4)_4Cl_2:Eu^{2+}$, $Mn^{2+}$; $Ba_2SiO_4:E^{2+}$; $Ba_2(Mg,Zn)Si_2O_7:Eu^{2+}$; $(Ba,Sr)Al_2O_4:Eu^{2+}$; and $Y_2O_3:Bi^{3+},Eu^{3+}$.

24. The lighting apparatus of claim 1, wherein the at least one region of luminescent material comprises a first region of luminescent material which emits a first spectrum and a second region of luminescent material which emits a second spectrum different from the first spectrum.

25. The lighting apparatus of claim 1, wherein the at least one region of luminescent material comprises a first region of luminescent material which emits red light and a second region of luminescent material which emits green light.

26. The lighting apparatus of claim 1, wherein the at least one region of luminescent material comprises phosphor blend which absorbs at least one of: blue light and UV radiation, and which emits white light.

27. A lighting apparatus comprising:
a light source;
a transmissive body optically coupled to the light source; and at least one region of luminescent material formed on a defined portion of the transmissive body, the at least one region of luminescent material forming an ornamental design on the transmissive body, wherein the at least one region of luminescent material absorbs light having a first spectrum transmitted through the transmissive body and emits light having a second spectrum outside of the transmissive body, and wherein the light source comprises a first light emitting diode which emits a first spectrum and a second light emitting diode which emits a second spectrum different from the first spectrum.

28. The lighting apparatus of claim 27, wherein the at least one region of luminescent material comprises a first luminescent material responsive to radiation from the first light emitting diode, and a second luminescent material responsive to radiation from the second light emitting diode.

29. The lighting apparatus of claim 28, wherein the first luminescent material is substantially unresponsive to radiation from the second light emitting diode, and the second luminescent material is substantially unresponsive to radiation from the first light emitting diode.

30. The lighting apparatus of claim 1, further comprising a second transmissive body optically coupled to the light source.

31. The lighting apparatus of claim 1, wherein at least a part of the at least one region of luminescent material is formed in a defined and distinct portion inside the transmissive body.

32. A decorative lighting apparatus comprising:
a first light source;
a second light source;
a transmissive body;
a first luminescent material formed on a first defined and distinct portion of the transmissive body, the first luminescent material being activated by the first light source;
a second luminescent material formed on a second defined and distinct portion of the transmissive body, the second luminescent material being activated by the second light source; and
a controller which activates the first and the second light sources according to a predetermined schedule.

33. A decorative lighting apparatus comprising:
a first light source;
a second light source:
a transmissive body;
a first luminescent material formed on the transmissive body which is activated by the first light source;
a second luminescent material formed on the transmissive body which is activated by the second light source, wherein the first and second luminescent materials produce an ornamental design; and
a controller which activates the first and second light sources according to a predetermined schedule.

34. The lighting apparatus of claim 33, wherein the first and second luminescent materials comprise first and second phosphors, respectively.

35. A method of making a lighting apparatus comprising the steps of:
optically coupling a light source to a transmissive body such that substantially all light emitted by the light source is transmitted through the transmissive body by total internal reflection;
forming at least one defined region of luminescent material on the transmissive body, the at least one defined region of luminescent material having an ornamental design; and generating light from the light source to activate the at least one defined region of luminescent material.

36. A method of making a lighting apparatus comprising the steps of:

optically coupling a light source to a transmissive body;

forming at least one region of luminescent material on the transmissive body, the at least one region of luminescent material having an ornamental design; and generating light from the light source to activate the at least one region of luminescent material, wherein:

the light source comprises at least one LED; and the at least one region of luminescent material comprises a first phosphor region emitting a first color and a second phosphor region emitting a second color.

37. The decorative lighting apparatus of claim 33, wherein light from the first and second light sources propagates through the transmissive body.

38. The decorative lighting apparatus of claim 33, wherein the ornamental design is in the form of at least one of: a picture, a letter, and a number.

39. The method of claim 35, wherein the light generated by the light source has a first wavelength; and the luminescent material absorbs the first wavelength and emits light having a second wavelength.

40. The method of claim 35, wherein the ornamental design is in the form of at least one of: a picture, a letter, and a number.

41. A method of making a lighting apparatus comprising the steps of:

providing a transmissive body;

optically coupling a light source to the transmissive body such that light emitted from the light source propagates into and through the transmissive body; and forming at least one defined and distinct region of luminescent material on a surface of the transmissive body, the at least one defined and distinct region of luminescent material being in the form of at least one of: a picture, a letter, and a number.

42. The method of claim 41, wherein the light emitted from the light source has a first wavelength; and the luminescent material absorbs the first wavelength and emits light having a second wavelength.

* * * * *